Aug. 30, 1932.  J. F. KOEPPEN, JR  1,875,019
MEASURING DEVICE
Filed May 28, 1930  3 Sheets-Sheet 1
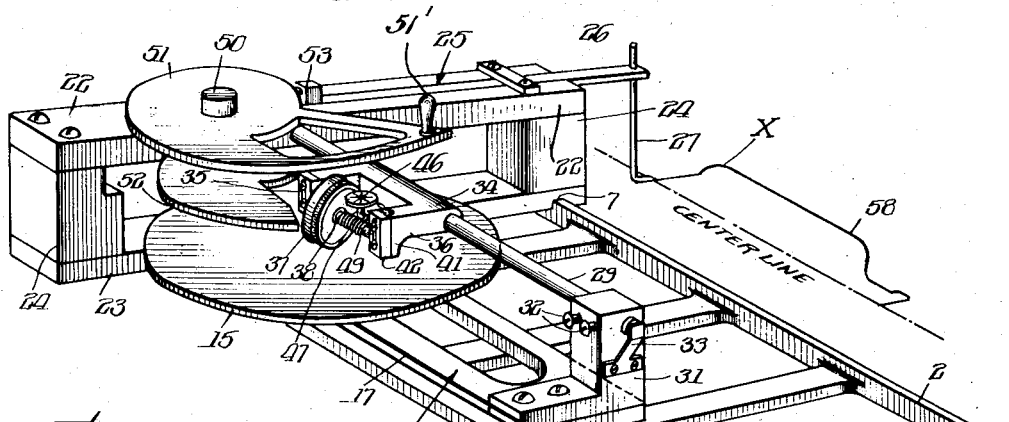
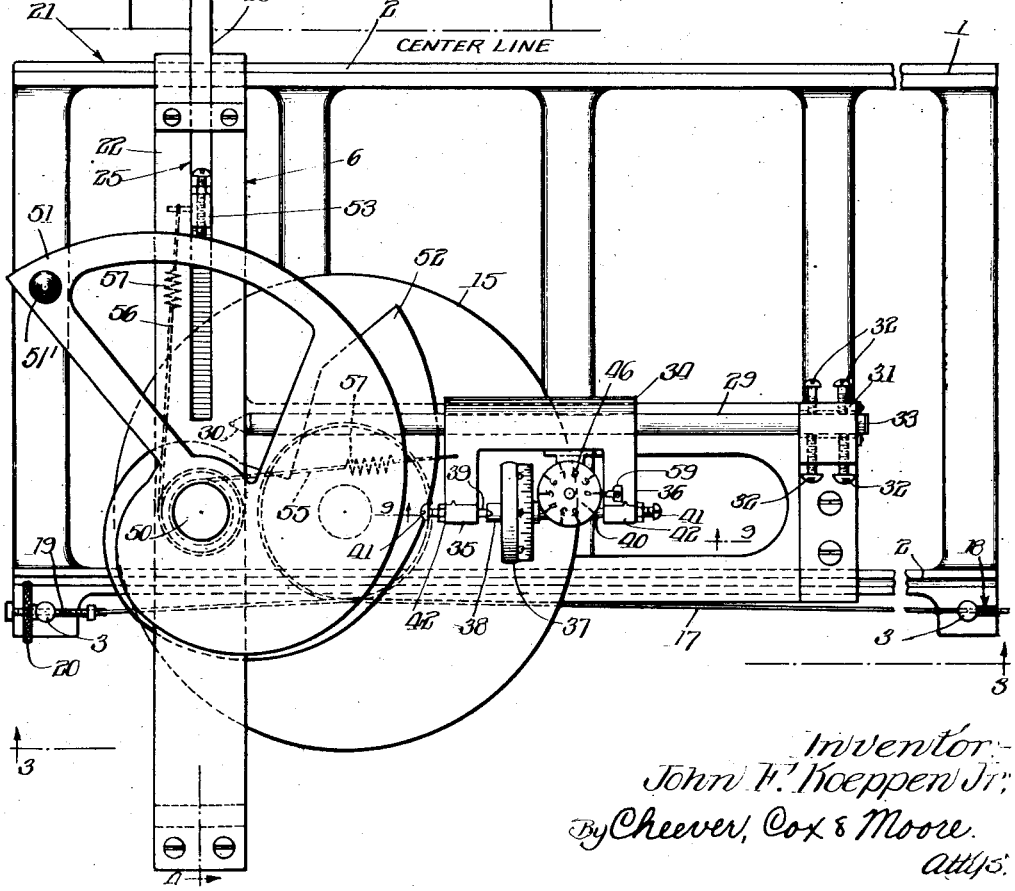
Inventor:-
John F. Koeppen Jr.
By Cheever, Cox & Moore
Attys.

Aug. 30, 1932.  J. F. KOEPPEN, JR  1,875,019
MEASURING DEVICE
Filed May 28, 1930  3 Sheets-Sheet 2
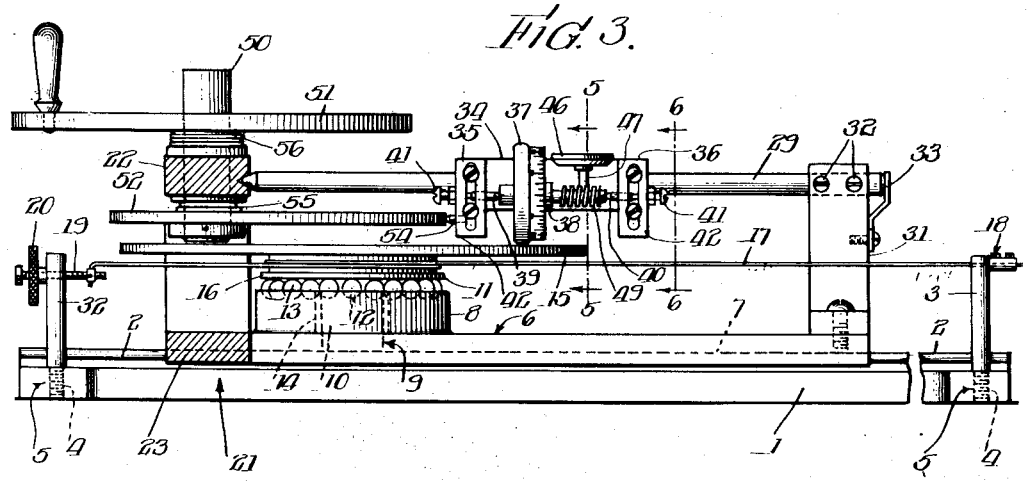
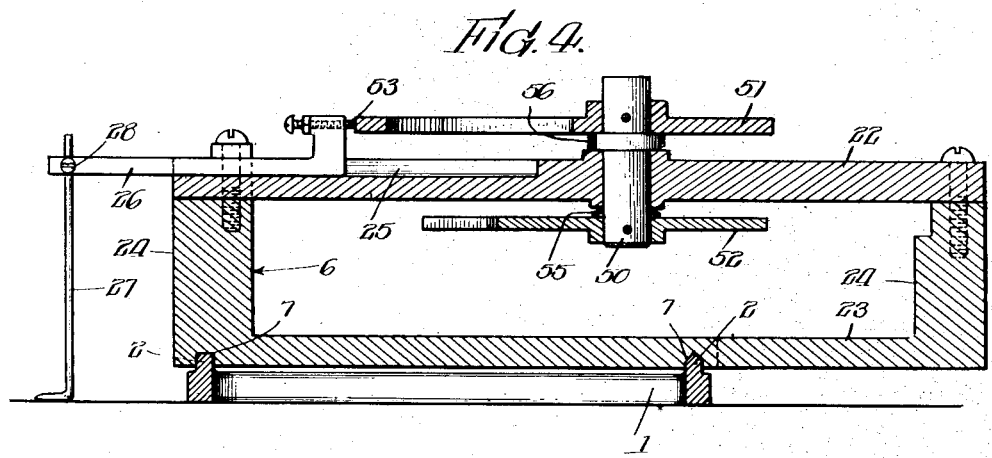
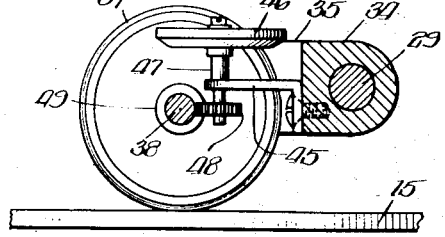
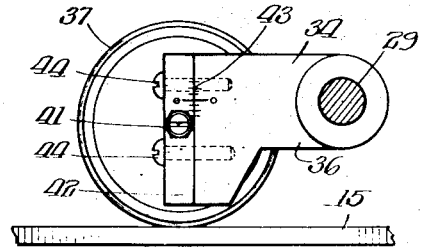
Inventor:
John F. Koeppen Jr.
by Cheever, Cox & Moore
attys.

Aug. 30, 1932.   J. F. KOEPPEN, JR   1,875,019
MEASURING DEVICE
Filed May 28, 1930   3 Sheets-Sheet 3
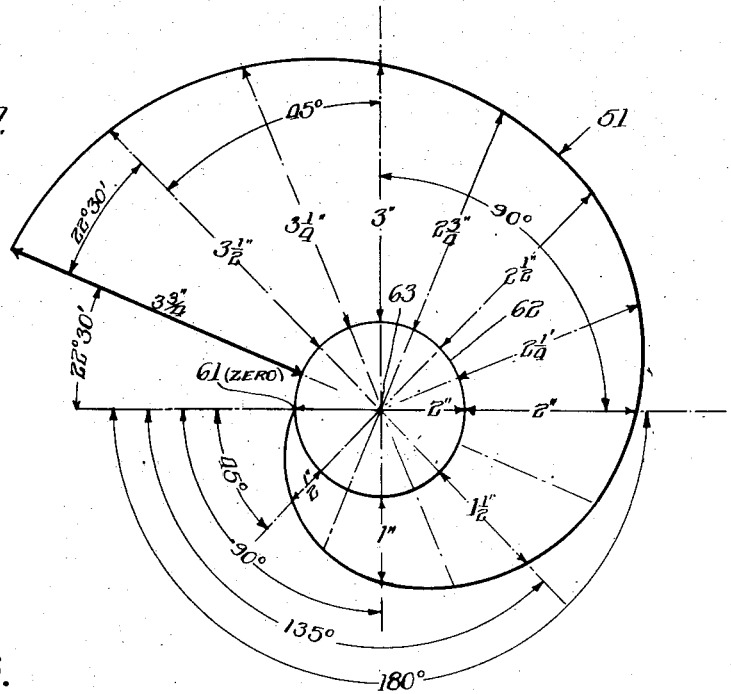
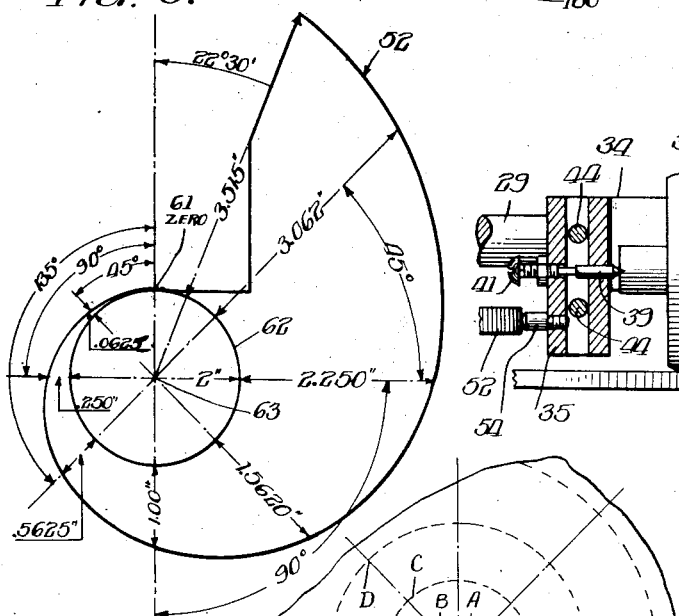
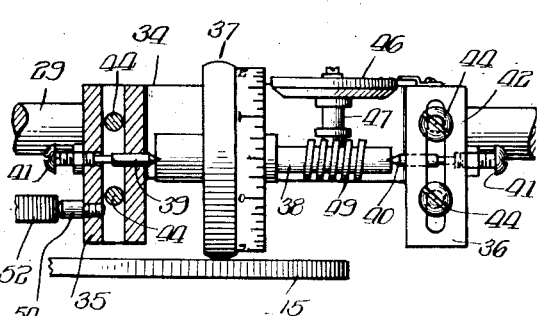
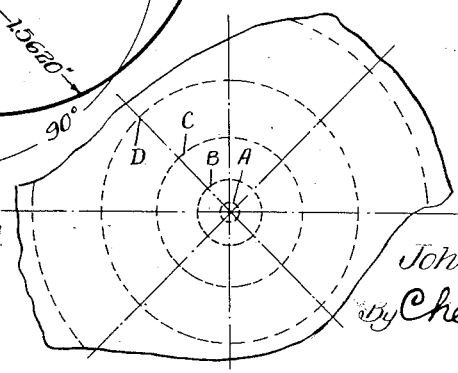
Inventor:
John F. Koeppen Jr.
By Cheever, Cox & Moore
attys.

Patented Aug. 30, 1932

1,875,019

UNITED STATES PATENT OFFICE

JOHN F. KOEPPEN, JR., OF MARION, INDIANA, ASSIGNOR OF SEVEN-SIXTEENTHS TO JOHN P. KOEPPEN AND ONE-EIGHTH TO MARY E. KOEPPEN, BOTH OF MARION, INDIANA

MEASURING DEVICE

Application filed May 28, 1930. Serial No. 456,512.

This invention relates to measuring devices in general, and specifically to measuring devices whereby the measurements taken may be read directly from a graduated scale.

The primary object of the present invention is to provide a measuring device which will measure the cubical contents or volume of an object.

Another object is to provide a measuring device which will measure the cubical contents or volume of an object that has a common center or axis.

Another object is to provide a measuring device which will measure the cubical contents or volume of an article by tracing the outline of a half vertical section of an article to be measured.

A further object is to provide a measuring device which has a frame slidably movable over a base, which has means operated by the slidable member, and which has manually controlled means for tracing a sectional figure to give the cubical contents or volume of the device being traced.

A further object is to provide a measuring device which is provided with means for measuring cubical contents or volume by a series of manually operated devices to register cubical contents and volume.

A still further object is to provide a measuring device having a plurality of cams for imparting motion to various parts of the device for tracing outlines to determine the volume of the object whose outline is traced.

Numerous other objects and advantages will be apparent throughout the progress of the following specification.

The invention comprises in general a base having tracks mounted thereon upon which an upper frame is slidably movable. A drum is revolubly mounted in the frame. Posts are fixed to opposite ends of the base and carry a flexible wire which passes about the drum to impart rotary movement to the drum upon sliding movement of the upper frame. A disk or plate is rigidly connected to the drum. End blocks or posts are fixed to the base and support a longitudinal guide rod upon which a suitable member having bearings is slidably mounted. A reading wheel is supported in these bearings and is adapted to rest or bear against the top of the plate or disk. This latter frame member is loosely mounted on the rod causing the reading wheel to bear against the plate or disk due to its own weight. A cross bearing member is rigidly connected to the sliding frame. A tracer arm is slidably movable in the cross bearing member and has a tracing rod or pointer adjustably connected thereto. A resilient member is operatively connected to the tracer arm for normally urging the tracer arm in one direction. A cam member comprising upper and lower cams is rigidly connected to a cam shaft which is revolubly mounted in the cross bearing member. The upper cam is adaptable for engagement with the tracer rod arm to move the tracer arm outwardly upon rotation of the cam, the resilient member retracting the tracer arm into constant engagement with the edge of the cam. The lower cam is movable with the upper cam and its outer edge is in engagement with the member carrying the reading wheel. Manual rotary movement of the upper cam, therefore, moves the tracer arm laterally and the reading wheel frame horizontally in a direction perpendicular to the motion of the tracer arm. The reading wheel frame also carries a dial which is operated upon movement of the reading wheel. Pointer elements or indicators are connected to the reading wheel frame so that the graduations on the dial and the read-wheel may be instantly read. When an outline is followed by the pointer arm, due to manually operating the cam members and sliding the frame on the base to follow this outline, the reading wheel and the dial will be rotated by motion imparted by the plate so that the cubical contents of the device being traced will be registered directly on the reading wheel and the dial. The upper cam is designed so that a predetermined rotary movement imparted thereto is equivalent to a certain number of inches diameter of the object being traced. The lower cam is made to a certain configuration to move the reading wheel to a position to register diameter on the disk. The upper cam moves the tracer pointer outwardly to trace the diameter, and the lower cam moves the reading wheel outwardly to register diameter, whereby slidable movement of the frame on the base, according to the height of the object being traced, will cause the reading wheel and dial to register the cubical contents or volume of the object being traced.

The accompanying drawings illustrate a selected embodiment of the invention and the views therein are as follows:

Fig. 1 is a detail perspective view of the improved measuring device or apparatus.

Fig. 2 is a detail plan view thereof.

Fig. 3 is a detail elevation partly in section looking in the direction of the arrows along the line 3—3 of Fig. 2.

Fig. 4 is a detail transverse sectional view on the line 4—4 of Fig. 2.

Fig. 5 is a detail sectional view on the line 5—5 of Fig. 3.

Fig. 6 is a detail sectional view on the line 6—6 in Fig. 3.

Fig. 7 is a schematic or diagrammatic view of the upper cam showing the manner in which the proper shape of the cam is determined.

Fig. 8 is a similar view of the lower cam showing the manner in which the proper shape of the cam is determined.

Fig. 9 is a detail sectional view on the line 9—9 of Fig. 2.

Fig. 10 is a geometrical view showing the path followed by the reading wheel during revoluble movement of the disk.

The particular measuring device herein set forth comprises a base 1 having parallel tracks 2. These tracks may be integral with the base or they may be made as separate elements and properly fixed to the base. Posts 3 are connected to opposite ends of the base and preferably have screw threaded lower ends 4, Fig. 3, which have engagement with threaded openings 5 provided in the base.

An upper frame 6 is slidably mounted on the base 1 and has longitudinal grooves 7 provided therein which receive the tracks 2. The frame 6 has an upwardly extending boss 8, Fig. 3, integrally formed therewith which is bored at 9 to receive a shaft or axis 10 of a drum 11. The boss 8 is provided with an annular groove 12 into which balls 13 are received to provide a ball-bearing support for the drum. A bearing 14 is provided for the shaft 10. A plate or disk 15 is rigidly connected with the drum 11 and is preferably made integral therewith. The bottom of the drum may rest directly on the balls 13 or the drum may be provided with a plate 16, Fig. 3, which extends beyond the periphery of the drum.

A resilient member 17, such as wire, may be connected to one end post 3 as indicated at 18, passed around the drum 11 and have its free end connected to the other post 3 through the medium of a threaded member 19 which carries a thumb nut 20 for adjusting the tension of the wire 17, Fig. 3.

The end 21 of the device has a cross bearing member 22 spaced from the cross arm 23 which is rigid with the frame 6. End blocks 24 are arranged between the arm 23 and the bearing member 22, Figs. 1 and 4. This member 22 has a groove 25 provided therein in which a tracer arm 26 is slidably mounted. This tracer arm has a rod or pointer 27 which is vertically movable therein to permit adjustment thereof and is supported in adjusted position by means of a set screw or other suitable device 28.

A guide rod 29 is suitably supported on the frame 6, the end 30 of the rod 29 being made conical or tapered and received in a corresponding depression or recess formed in the cross bearing member 22. The opposite end of the rod 29 is slidably mounted in a block 31 which is rigid with the frame 6. Set screws 32 threadedly engage a part of the block 31 for permitting fine lateral adjustment of the guide rod 29. A clip 33 is fixed to the block 31 and engages the outer free end of the guide rod 29 for normally urging the end 30 of the rod in its corresponding recess. A frame 34, Figs. 2 and 9 is slidably mounted on the guide rod 29 and has parallel extending arms 35 and 36. A reading wheel or sight element 37 having a shaft 38 is positioned between the arms 35 and 36 and is revolubly supported by the bearings 39 and 40. The bearings 39 and 40 comprise steel centers which engage recesses in the ends of the shaft 38. Screw members 41 may be provided for moving the bearings 39 and 40 to effect proper adjustment of the reading or registering wheel 37. The steel centers 39 and 40 may be mounted in separate blocks 42 which are fastened to the ends of the arms. These blocks have a tongue and groove connection with the arms to permit vertical adjustment of the reading or registering wheel 37. Graduations 43, Fig. 6, are provided on the arm and on the blocks 42 to determine the amount of vertical adjustment required or made. Screw members 44 are provided to lock the parts in adjusted position, Figs. 3, 6, and 9.

A bracket 45, Fig. 5, is connected to the frame 34 and revolubly supports a dial 46. The dial 46 has a shaft 47 upon which a pinion gear 48 is fixed. This pinion gear 48 is adapted to mesh with a worm gear 49 on the reading or registering wheel shaft 38.

A cam shaft 50, Fig. 4, is revolubly mounted in the cross bearing member 22. An upper cam 51, having an operating handle 51′, is fixed to this shaft above the cross bearing member 22 and a lower cam member 52 is fixed to the cam shaft 50, the cam member 52 being arranged below the cross bearing member 22. Both of these cams are rigidly connected to the cam shaft whereby movement imparted to one cam gives an equal angular motion to the other cam. The upper cam engages a contact unit 53 which is fixed to the tracer arm 26 for imparting movement thereto, while the lower cam engages a contact point or member 54, Fig. 3, for imparting motion to the frame 34. A yieldable member 55 is connected to the frame 34 and is connected to and wound around the cam shaft 50 below the cross bearing member 22 for normally holding the frame 34 in proper position relative to the lower cam 52. A second yieldable member 56, Fig. 2, which is similar to the yieldable member 55, is connected to the tracer arm and is connected to and wound around the cam shaft 50 above the cross bearing member 22. This member 56 normally keeps the contact unit 53 in operative position relative to the upper cam 51. A coil spring 57 may be interposed between the yieldable members 55 and 56 in any convenient manner for maintaining an urging movement toward the cams.

The device is used for tracing a half vertical section of an article for which the cubical contents are to be determined. When the tracer arm is followed about the outline of a vertical half section 58 of the object to be measured, the upper cam is moved in order to make the tracing rod arm follow this outline, and the frame 6 is slid across the base the length of the article being traced. The movement thus imparted causes rotation of the reading wheel which is graduated and marked to register the cubical contents of the object traced. The reading wheel thus moves the dial, and the reading wheel and dial in the present device are so made that one revolution of the reading wheel will move the dial one-tenth of a revolution, the dial being graduated into ten equal parts. A pointer or indicator 59 is provided for the dial and a similar pointer (not shown) is provided for the reading wheel. Should the dial read one and the reading wheel read two, the result set down is twelve. The reading wheel has ten major divisions each with ten subdivisions, one major division being equivalent to ten cubic inches. Therefore, when twelve is read, the device designated by the outline 58 contains one hundred and twenty cubic inches, the reading wheel having turned one and two-tenths complete revolutions.

The upper cam

The upper cam 51, Fig. 7. is designed so that an angular motion of forty-five degrees will move the tracing rod pointer out along its path a distance of one-half an inch which is equivalent to one inch diameter of the article being traced. The zero point 61 of this cam is on a circle 62 which has a radius of one inch from its center 63. For the purpose of arriving at some definite figure to begin with, this zero point is a two inch circle. Forty-five degrees from this zero point a distance of one-half an inch is laid off. This one-half inch distance, for convenience in laying out the present device is made to be equivalent to one inch diameter of the outline 58. At ninety degrees the distance from the two inch base circle is made one inch, or the equivalent to a diameter of two inches of the object being traced. At one hundred and thirty-five degrees the distance from the base circle to the periphery of the cam is one and one-half inches which is equivalent to three inches diameter of the figure being traced. At one hundred and eighty degrees the distance from the base circle to the periphery of the cam is two inches or the equivalent of four inches diameter of the object being traced. This measuring from the base circle is continued to the end of the cam which is the limit of the diameter that can be measured. In the present case the cam is made to equal three hundred and thirty-seven degrees and thirty minutes. These measured distances, from the base circle to the periphery of the cam, are connected by a smooth curve which forms the shape of the cam. The purpose of this upper cam is to move the rod pointer out along its path, so that a certain distance of the rod pointer will correspond with a predetermined diameter of the outline being traced.

The lower cam

The lower cam 52, Fig. 8, is so designed that beginning with the base or zero point 61 of the base circle 62 having a two inch diameter, an angular motion of forty-five degrees will be .0625 inches from the base circle. At ninety degrees from the zero point the distance will be .250 inches from the base circle, and at one hundred and thirty-five degrees the distance from the base circle will be .5625. This system of measuring is carried on at equal intervals around the three hundred and thirty-seven degree and thirty minute periphery of the cam where the distance from the base circle is 3.515 inches. These measured points are connected with a smooth curve and form the outline of the cam. A cam of this size permits an article not greater than seven and one-half inches in diameter to be measured. This lower cam is for the purpose of moving the reading wheel outwardly a given distance from the exact geometric center of the disk. This distance is such that the circumference of a circle having a radius equal to this given distance will correspond to the diameter squared of the object measured. Therefore the reading wheel will represent the volume of the object traced as the pointer traces the outline of the half vertical section of the object traced. Thus, three dimensions are obtained in tracing the outline.

If the reading or registering wheel is on the exact geometric center of the disk (and it will be at that place when the cams are set at zero), any motion of the slidable frame along the base will rotate the disk but will not turn the reading wheel. Any motion of the cams moves this reading wheel away from this geometric center so that when the slidable frame is moved along the base, thereby causing the disk to turn, the cams will have pushed the reading wheel away from this geometric center, causing the reading wheel to turn.

When height is measured, which is done by sliding the frame 6 along the base 1, the disk 15 will revolve, the present device being so designed that movement of the frame 6 along the base 1 a distance of one inch, which is the equivalent of one inch in height of the object being measured, will cause the disk 15 to move one-eighth of a revolution or forty-five degrees.

There must be a base or starting point for any measurement, and the present device is based upon an object whose volume is one cubic inch the base of the object being one inch square and being one inch in height. In Fig. 10 there is shown geometrically the movement of the reading wheel proportionately to the movement of the cams 51 and 52. When an object is measured whose base is one inch wide, the cams are operated to follow the half section of the base and the cams are thus set for a diameter of one inch. By sliding the frame 6 along the base a distance of one inch, which is the equivalent of one inch in height of the object being measured, the reading wheel will have followed a path which corresponds to circle A but has only gone one-eighth of the total distance around the disk. One-eighth of the circumference of circle A is taken as one squared ($1^2$), or 1. The circumference of circle B, Fig. 10, which is where the reading wheel will be when measuring an object with a base of two inches, is four times the circumference of the circle A. Therefore, one-eighth of the circumference of the circle B will be four times greater than circle A, and circle C, which has a diameter of three inches, is nine times greater than circle A. Circle D is sixteen times greater. When the lower cam moves the reading wheel out to any of the circles, the upper cam moves the tracing rod pointer out a distance equal to the radius of the base of the object of the given size measured.

Cam 52 is so constructed that forty-five degrees from zero point 61, the distance from the base circle or zero point 61 to the outer edge or the periphery of the cam 52 will be one-sixteenth of an inch or .0625. The radii of the corresponding circles are exactly equal to the corresponding points or distances in the order of the circles from the base circle 62 or zero point of cam 52 to the outer edge or periphery of the cam.

Operation

As an example as to what the device will do, the fluid contents of an object such as a bottle will be determined. In order to carry out the aim sought, a vertical cross section 58, of the bottle whose volume is to be found, with an extended center-line is drawn. The base of this machine is then arranged so that the tracks will be parallel with the extended center-line of the outline. The machine is then set so that the cams will be at the zero point, and the point of the rod pointer set to coincide with the center-line of the bottle. Therefore, if the slidable frame is moved along the base, the tracing rod pointer will coincide at all points with the extended center-line. The slidable frame is then set on the base in such a position that the tracing rod pointer will be at the base of the drawing, as shown in Fig. 1. The cams are then operated by turning until the tracing rod pointer has reached the outline of the section at its base which is indicated at X, Fig. 1. The slidable frame is then moved along the base, and the cams are also operated so that the tracing rod pointer will at all times coincide with the outline of the drawing outwardly of the center-line. The cams are means for indicating or measuring the width or diameter of the object being traced, while the movement of the sliding frame along the track indicates or measures the height of the object being traced. The combined motion of the reading wheel actuated by the cams, and the disk actuated by the wire, register the cubical contents or volume of the object whose outline has just been traced on the reading wheel and dial.

One cubic inch is equivalent to approximately .6 fluid ounces. Therefore, if the result or reading taken from the reading wheel and dial is multiplied by .6, the result will be in fluid ounces.

The result of any object measured by the device is based on an object whose base is a square. One side of the object is equivalent to the width of the base line of the outline of the vertical section drawing. If the present bottle, just traced, were for example round, it would be necessary to multiply the result by .7854, which is pi over 4 or $\frac{3.1416}{4}$, because the area of a circle inscribed in a square, one side of which is equivalent to the diameter of the circle, is equal to diameter squared multiplied by pi over 4 or $\frac{3.1416}{4}$ which equals .7854. Any object would be measured as above described, considering that the cross section of the object has a square base. The result is multiplied by a given factor which converts the volume of a square base into the volume of any shape. Instead of multiplying the result by .7854, the indicating means can be graduated to read the direct cubical contents of a cylindrical article without the necessity of multiplying the result by the aforementioned factor.

If an object is to be measured which has a height greater than that for which the device is designed, but the diameter does not exceed the limit of the device, the object can be divided into several parts so far as the height is concerned, each part of which has a height not exceeding the limit of the device, and each of these parts measured and the sum of each part added together will give the total. If the diameter exceeds the limit of the machine, the drawing of the section can be made to a reduced scale, the reduced drawing measured, and the result multiplied by the scale cubed. For example, if a reduced drawing is made wherein a one inch scale equals two inches, the result must be multiplied by two cubed or eight. If the scale were one to three, the result would be multiplied by twenty-seven, which is three cubed.

The invention provides a device which will quickly and accurately determine the cubical contents or volume of any kind of a container such as a tank, bottle, or any other article. The device is simple and efficient in operation, is rigid in construction, and may be readily and economically manufactured. The device is also light in weight and can be quickly operated and moved from place to place. The cams are proportioned to perform the function for which they were designed accurately and efficiently. The entire parts constituting the device are arranged advantageously so that the device may be quickly manipulated. The upper cam is cut out so that the reading wheel and dial will be in plain view.

While a bottle has been employed to illustrate the mechanics of the invention, it is to be understood that any other object or article may be measured and the invention is not to be limited for measuring the volume of bottles only.

Changes may be made in the form, construction, and arrangement of the various parts without departing from the spirit of the invention or sacrificing any of its advantages, and the right is hereby reserved to make all such changes as fairly fall within the scope of the following claims.

The invention is hereby claimed as follows:

1. A device for indicating the cubical contents of a symmetrical article from a diagram showing a sectional contour of said article comprising a tracing element adapted to follow said sectional contour, means for actuating the tracing element to follow said sectional contour, an indicator having graduations to indicate cubical measurement, and means controlled by said first named means for operating the indicating means.

2. A device for indicating the cubical contents of a symmetrical article from a diagram showing the sectional contour of said article, comprising a tracer, tracer actuating means for causing it to trace the outline of the diagram, an indicator reading in terms of cubical contents, and computing mechanism operative upon said indicator and actuated by said tracer actuating means, whereby the movement of the tracer causes the indicator to indicate the contents of the article whose sectional contour is traced.

3. A device for indicating the cubical contents of a symmetrical article from a diagram showing the sectional contour of said article, comprising a tracer for tracing the longitudinal sectional outline of the article, an indicator, and instrumentality between the tracer and the indicator for actuating the latter, said instrumentality including an element moving in accordance with the ordinates of the diagram, a second element moving in accordance with the abscissa of the diagram, and a third element controlled by the operation of the first two elements, and indicating in accordance with a factor depending upon the cross-sectional area of the article to be measured.

4. A device for indicating the cubical contents of a symmetrical article from a diagram showing the sectional contour of said article, comprising a tracer for tracing the outline of the article, actuating means for moving the tracer in one direction corresponding to the ordinates of the diagram, other actuating means for moving the tracer at an angle thereto corresponding to the abscissa of the diagram, an indicator, and connections influenced by both said actuating means for actuating the indicator, said connections being controlled by the movement of either or both of the actuating means to operate the indicator to indicate the cubical contents of the article.

5. A measuring device comprising a base, a frame mounted to slide on said base, a plate revolubly mounted on said frame, means supported by the base and cooperating with said plate to rotate said plate when said frame is slid on said base, a second frame slidably mounted on said first named frame, a reading wheel revolubly mounted in said second frame and normally engaging said plate, a pointer arm for tracing the outline of an object whose volume is to be determined, a revolubly mounted cam for moving said pointer at right angles to the movement of the frame, a second cam having the same axis as said first named cam and movable therewith, said second cam engaging said second frame for shifting said reading wheel radially on said plate, and a dial supported by said second frame and controlled by the movement of the reading wheel, said reading wheel and dial being provided with graduations to designate contents or volume of the article whose outline is traced.

In witness whereof, I have hereunto subscribed my name.

JOHN F. KOEPPEN, Jr.